March 19, 1968 K. H. MILLER 3,373,927
FLUID COMPRESSOR
Filed June 1, 1966 2 Sheets-Sheet 1

INVENTOR.
KENNETH H. MILLER.
BY Raymond Curten

ATTORNEY.

March 19, 1968

K. H. MILLER 3,373,927

FLUID COMPRESSOR

Filed June 1, 1966

2 Sheets-Sheet

INVENTOR.
KENNETH H. MILLER.
BY Raymond Curtin
ATTORNEY.

United States Patent Office 3,373,927
Patented Mar. 19, 1968

3,373,927
FLUID COMPRESSOR
Kenneth H. Miller, Syracuse, N.Y., assignor to Carrier Corporation, Syracuse, N.Y., a corporation of Delaware
Filed June 1, 1966, Ser. No. 554,417
6 Claims. (Cl. 230—116)

This invention relates to a centrifugal compressor. More particularly this invention relates to a turbine driven fluid compressor wherein the compressor impeller and turbine wheel are separated from each other by a fluid-tight wall. Still more particularly this invention relates to a turbocompressor wherein the turbine wheel is magnetically coupled to the compressor impeller for rotating the impeller.

In many processes where it is necessary to compress fluids, compact compressor units such as a high speed turbine-compressor are used. One such application is in the refrigeration field where high speed turbocompressors are utilized to compress refrigerant in a refrigeration system. In the ordinary construction of a turbocompressor, seals are provided on the compressor impeller-turbine wheel shaft to prevent lubricant or motive fluid leakage from the turbine or driver section of the housing into the compressor section of the housing and to prevent process fluid or impeller leakage into the turbine or driver section of the housing along the common shaft. A great variety of seals have been utilized for this purpose, none of which have the desired durability and seal efficiency to match the long life of the other components in present turbocompressors. To avoid the problems presented by seals, indirect magnetic drives have been proposed which eliminate the common shaft. However, many problems have been encountered in the development of magnetically coupled turbocompressors. Large magnets are required to transmit the required torque, desirable high magnetic strength ceramic magnets cannot withstand the large centrifugal stresses developed in high speed operation, large axial forces resulting from the attraction between the driving and driven magnets put excessive thrust loads on the bearings, and deflection of the diaphragm between the driving and driven elements is common due to a combination of the high pressure differential usually existing between the compressor section and the turbine or driver section of the housing and the thin cross section of the diaphragm which is required to maintain the driving and driven magnets in close proximity to attain maximum torque transmission.

It is the chief object of this invention to provide an improved fluid compressor. It is another object of this invention to provide a compressor magnetically coupled to the compressor driver.

The objects of this invention are attained by providing a central frame member having an integral diaphragm dividing the central frame into a compressor section and a turbine section. A stationary impeller shaft and a stationary turbine wheel shaft are integrally formed with or solidly affixed to the diaphragm and project into the compressor section and the turbine section respectively. The compressor impeller and turbine wheel are mounted on bearings on the stationary shafts. The bearings have upstanding flange portions which act in conjunction with the faces of the diaphragm as thrust bearings. A novel compressor impeller is provided which has a portion thereof extending radially beyond the impeller blade tips. The side of the impeller facing the diaphragm has a magnetic ceramic ring solidly affixed to the portion of the impeller extending beyond the impeller blade tips. The impeller may be provided with a flange which encircles the circumference of the magnetic ring to compensate for the low mechanical strength of the ring. The compressor section cover includes a process fluid inlet, diffuser section, collection chamber and a compressed process fluid outlet. A thrust bearing is mounted on the inner face of the compressor section cover for running engagement with the radially extending portion of the impeller. A magnetic ring is mounted on the turbine wheel in a manner similar to the magnetic ring mounting on the impeller to magnetically couple the impeller to the turbine wheel.

Other objects and features of my invention will be apparent upon a consideration of the ensuing specification and drawings in which.

Figure 1:
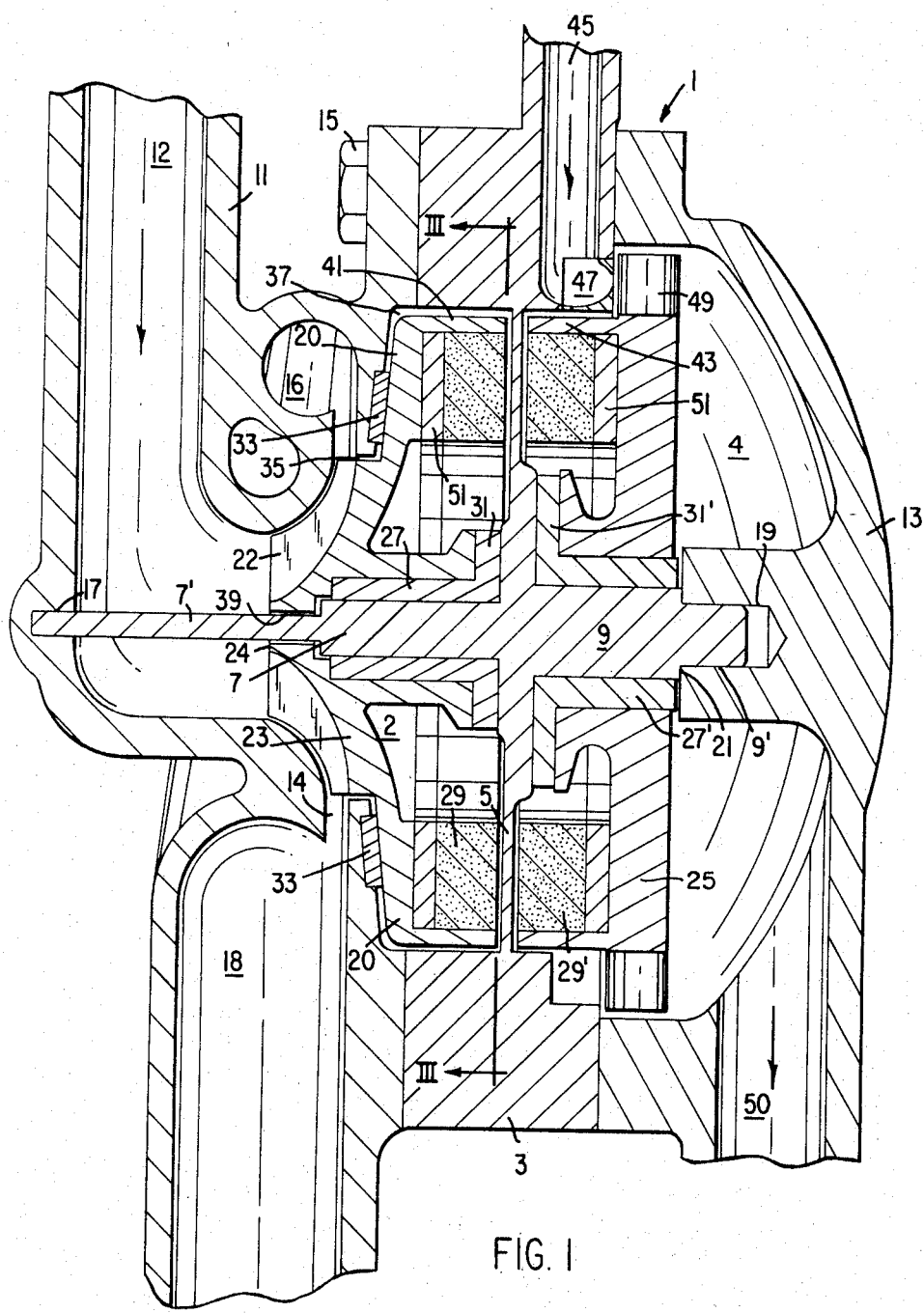
FIGURE 1 is a cross sectional elevation view of the turbocompressor forming the subject of my invention.

Referring more particularly to the drawings there is shown a turbocompressor 1 having a central frame member 3. This could be made of non-magnetic alloy steel, aluminum, magnesium or any other well known non-magnetic material. Central frame member 3 has an integral diaphragm 5 therein with extensions, providing stationary shafts 7 and 9, formed thereon. While it is preferred to form the central frame member, diaphragm, and stationary shafts as one piece for strength and rigidity, if a shaft material different than that used for the central frame member is desired, the shafts could be fabricated separately and attached to the diaphragm by welding or other suitable means. It is also possible to make shafts 7 and 9 in one piece, insert the combined shaft through a hole in the diaphragm and then solidly affix it thereto. Compressor cover 11 and turbine cover 13 are suitably affixed to central frame 3 as by bolts 15 to form a housing for the parts. The covers 11 and 13 are utilized not only to enclose the compressor section 2 and driver or turbine section 4 but also to axially position shafts 7 and 9 to prevent deflection of diaphragm 5. In the preferred embodiment of my invention, shafts 7 and 9 are provided with reduced diameter sections 7' and 9' for mating engagement with blind holes 17 and 19 in the compressor and turbine covers 11 and 13. The shoulder 21 formed by the reduced shaft section 9' bears against the inner wall of cover 13 while the end of reduced section 7' of shaft 7 bottoms in blind hole 17 to prevent axial movement of the shafts and prevent deflection of diaphragm 5. The cover 11 has process fluid inlet passage 12, diffuser section 14, collection chamber 16 and process fluid outlet passage 18 formed therein.

A novel impeller assembly 23 is mounted on shaft 7 in the compressor section 2 of the turbocompressor housing. The impeller has a radially extending portion 20 beyond the tips of the impeller blades 22. A thrust bearing 33 affixed to the inner face of cover 11 is provided for bearing engagement with the front face of impeller wheel portion 20.

Ordinarily, a thrust bearing would be provided for bearing relation on face 24 of impeller wheel 23. However, the small surface area of face 24 combined with the high speed of the turbocompressor and the large thrust loads that may be encountered result in a very short service life of bearings in this location. The novel construction of the impeller wheel 23 and cover 11 provides a location for placement of a thrust bearing having a large surface area resulting in minimal wear thereof.

A combination bearing 27 is provided for rotatably mounting impeller wheel 23 on shaft 7, an upstanding flange portion 31 of bearing 27 being provided for bearing relation on diaphragm 5.

The preferred embodiment of my invention is particularly adapted for use in a refrigeration system as a refrigerant compressor. In such an application, the impeller would operate in the 40,000 to 90,000 r.p.m. range. At such speeds it is possible to use gaseous refrigerant as a lubricant. In view of this, compressed refrigerant is bled through passageway 35, across bearing 33, through clearance 37 to the back of impeller 23. From there it escapes between shaft 7 and bearing 27, through clearance 39 to the inlet side of impeller 23. The refrigerant pressure behind impeller 23 forces the impeller toward thrust bearing 33 against the attractive force of magnetic rings 29 and 29', magnetic ring 29 being mounted on impeller wheel 23 and magnetic ring 29' being mounted on turbine wheel 25. By proper selection of impeller wheel bearing clearances and bleed passages, the axial forces on the impeller can be balanced to minimize wear on the thrust bearing 33 and upstanding flange portion 31 of bearing 27.

The turbine wheel 25 mentioned above is mounted on shaft 9 in the turbine section 4 of the turbocompressor housing. A combination bearing 27' having an upstanding flange portion 31', similar to bearing 27 is provided for turbine wheel 25. Motive fluid, introduced through passage 45 in central frame member 3, passes through nozzle ring 47, solidly affixed to central frame member 3 and impinges on blades 49 of turbine wheel 25, causing the turbine wheel to rotate. High pressure motive fluid may be utilized for lubrication and thrust force balancing of the turbine wheel in a manner similar to that utilized for the impeller wheel 23. The spent motive fluid is then exhausted through passageway 50 formed in cover 13.

To achieve the magnetic coupling described above, the impeller and the turbine wheel support the ceramic magnetic rings 29 and 29' which are solidly affixed thereto. The ceramic magnetic rings have a low mechanical strength. To provide support for the rings at the extremely high rotary speeds encountered in turbocompressor operation, axial flange 41 on impeller wheel 23 and axial flange 43 on turbine wheel 25 are provided which encircle the rings.

The ceramic magnetic rings must be mounted on a magnetic material such as soft iron to be magnetized and to improve the magnetic flux path. Also, there must be an air gap or non-magnetic material behind the magnetic material the rings are mounted on, around the periphery of the ring and in the space encircled by the ring. In the preferred embodiment illustrated in FIGURE 1, continuous ring-shaped metallic plates 51 are bonded between the magnetic rings 29 and 29' and rotors 23 and 25, respectively. Since the rotors illustrated in FIGURE 1 are made of non-magnetic material, the above mentioned mounting requirements are met.

Figure 2:
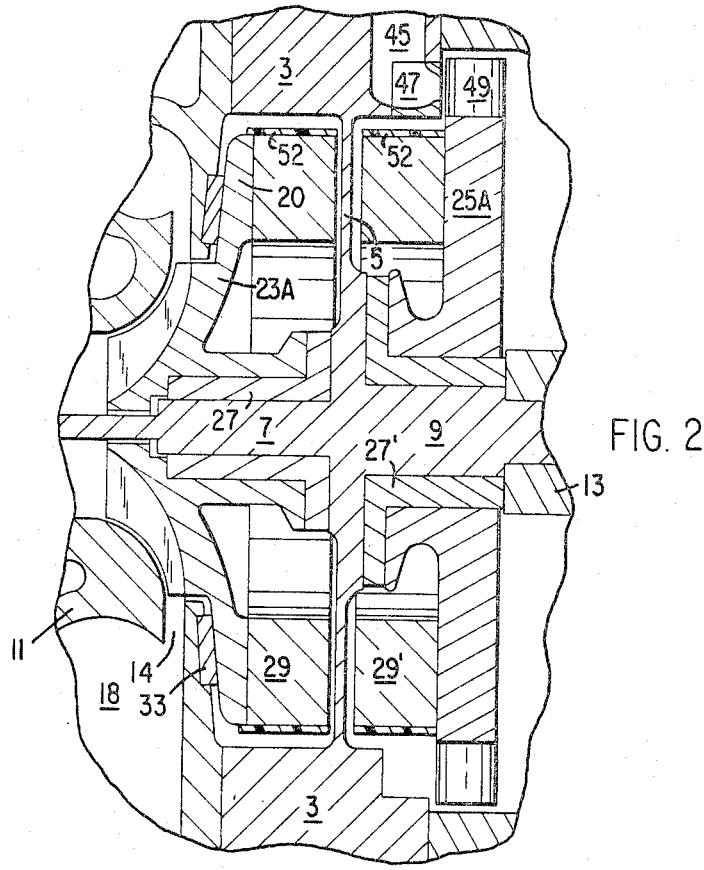
FIGURE 2 is a partial sectional view of a second embodiment of my invention.

In FIGURE 2, which is a partial sectional view of a second embodiment of my invention wherein parts identical to those in FIGURE 1 are numbered accordingly, I have illustrated modified turbine and impeller rotors. Turbine wheel 25A and impeller 23A are constructed of a magnetic material such as magnetic stainless steel. As such, magnetic rings 29' and 29 may be bonded directly to the rotors and magnetized thereon. To prevent portions of the periphery of the rings from breaking away due to high centrifugal loads imposed under normal operating conditions, a shrinkable ring 52 of a non-magnetic material such as metal or heat shrinkable plastic is provided encircling the rings. Note that in this embodiment, flanges on wheels 23A and 25A would not be acceptable as this would surround the rings 29 and 29' with a magnetic material.

Figure 3:
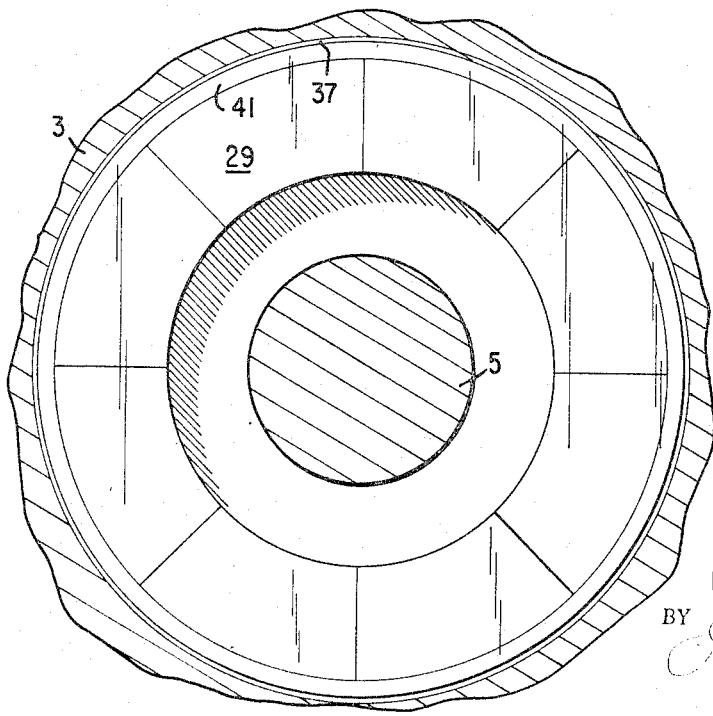
FIGURE 3 is an elevational view, taken along lines III—III of FIGURE 1, of the ceramic magnetic ring.

FIGURE 3 is a plan view of one of the magnetized ceramic rings utilized in the magnetic coupling showing the orientation of poles therein. In the preferred embodiment of my invention, the rings are magnetized so as to contain 8 poles.

Although I have described a turbine driven compressor, it is to be understood that the compressor impeller could be magnetically driven by an electric motor or other similar prime mover as well.

While I have described a preferred embodiment of my invention, it is to be understood that my invention is not limited thereto by may be otherwise embodied within the scope of the following claims.

I claim:
1. Fluid compression apparatus comprising:
   a central frame member including a diaphragm formed thereon;
   an impeller shaft on the diaphragm projecting substantially normal thereto;
   impeller bearing means having an upstanding flange portion engaging said diaphragm;
   an impeller mounted on said impeller bearing means, said impeller having blades formed thereon and a radially extending portion;
   a cover connected to the central frame member and forming therewith a compressor section enclosing said compressor impeller, said cover having a process fluid inlet passage, a diffuser passage, a collection chamber, and a process fluid outlet passage formed therein;
   a thrust bearing affixed to the inner face of said cover for bearing engagement with the radially extending portion of said impeller;
   magnetic means mounted on the back of said impeller on said radially extending portion; and
   means positioned on the opposite side of the diaphragm magnetically coupled to said magnetic means for rotating said impeller.

2. A compressor according to claim 1 wherein said impeller is made of a non-magnetic material, said impeller having a flange formed thereon at the periphery of the radially extending portion thereof for surrounding the periphery of said magnetic means, a ring-shaped plate made of magnetic material, said plate being positioned between the back face of said impeller and said magnetic means.

3. A compressor according to claim 1 further including a shrinkable ring, positioned and shrunk about the periphery of said magnetic means to prevent failure of said magnetic means under high centrifugal loads.

4. A compressor according to claim 1 wherein said means for driving said impeller comprises:
   a turbine shaft solidly affixed to the diaphragm projecting rearwardly therefrom;
   a turbine wheel bearing, said turbine wheel bearing being mounted on said turbine shaft and having an upstanding flange portion bearing on said diaphragm;
   a turbine wheel, mounted on said turbine wheel bearing; and
   second magnetic means mounted on said turbine wheel opposite the magnetic means on said impeller.

5. A compressor according to claim 4 wherein said turbine wheel is made of a non-magnetic material, said turbine wheel having an axial flange portion projecting therefrom towards said diaphragm surrounding the periphery of said second magnetic means and a ring shaped plate made of a magnetic material, said plate being positioned between the back face of said turbine and said second magnetic means.

6. A compressor according to claim 4 further including shrinkable rings positioned and shrunk about the periphery of said magnetic means to prevent failure of said magnetic means under high centrifugal loads.

References Cited
UNITED STATES PATENTS 2,471,753 5/1949 Johnson _____ 103—87
3,089,514 5/1963 Sudmeier _____ 103—87 XR ROBERT M. WALKER, *Primary Examiner.*